(12) United States Patent
Zhu et al.

(10) Patent No.: US 10,386,495 B1
(45) Date of Patent: Aug. 20, 2019

(54) METHOD AND APPARATUS FOR DETECTING POOR DOPPLER MEASUREMENT RESULTS IN GLOBAL NAVIGATION SATELLITE SYSTEM NAVIGATION

(71) Applicant: Marvell International Ltd., Hamilton (BM)

(72) Inventors: Qiufang Zhu, Shanghai (CN); Jiangping Deng, Shanghai (CN); Zhike Jia, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 192 days.

(21) Appl. No.: 15/362,284

(22) Filed: Nov. 28, 2016

Related U.S. Application Data

(60) Provisional application No. 62/261,007, filed on Nov. 30, 2015.

(51) Int. Cl.
*G01S 19/23* (2010.01)

(52) U.S. Cl.
CPC .................. *G01S 19/23* (2013.01)

(58) Field of Classification Search
USPC ..................................... 342/357.62
See application file for complete search history.

(56) References Cited

U.S. PATENT DOCUMENTS

2017/0068001 A1* 3/2017 Chhokra ................. G01S 19/40

* cited by examiner

*Primary Examiner* — Harry K Liu

(57) ABSTRACT

Methods, systems, and apparatus for detecting poor Doppler measurements results in GNSS navigation, in one aspect, a method including: calculating a first Doppler shift value, wherein the first Doppler shift value is based on movement of a Global Navigation Satellite System (GNSS) receiver and calculated according to a Doppler measurement result; calculating a second Doppler shift value, wherein the second Doppler shift value is based on movement of the GNSS receiver and calculated according to a projection of velocity of the GNSS receiver on a line of sight (LOS) vector; comparing the first Doppler shift value with the second Doppler shift value to check an accuracy of the Doppler measurement result; and determining at least a direction of movement of the GNSS receiver in accordance with the checked accuracy of the Doppler measurement result.

20 Claims, 4 Drawing Sheets

METHOD AND APPARATUS FOR DETECTING POOR DOPPLER MEASUREMENT RESULTS IN GLOBAL NAVIGATION SATELLITE SYSTEM NAVIGATION

CROSS-REFERENCE TO RELATED APPLICATIONS

This application claims the benefit under 35 U.S.C. § 119(e) of U.S. Patent Application No. 62/261,007 entitled, "METHOD AND APPARATUS FOR DETECTING POOR DOPPLER MEASUREMENT RESULTS IN GLOBAL NAVIGATION SATELLITE SYSTEM NAVIGATION", filed Nov. 30, 2015, which is incorporated herein by reference in its entirety.

BACKGROUND

The present disclosure relates to Global Navigation Satellite System (GNSS) navigation, and more particularly to a method and apparatus for detecting poor Doppler measurement results in GNSS navigation.

With the development of electronic technologies, the GNSS receiver module has become a standard feature in some electronic products such as mobile phones, tablet computers, cameras and wearable products. Existing GNSS receivers provide the position, velocity, and time (PVT) for navigation. The accuracy of the velocity (speed and direction) is highly dependent on the accuracy of Doppler measurement results.

In an urban environment, for example, multipath (MP) signal interference can be very severe, which affects the quality of Doppler measurements. In instances when the receiver is moving, a Doppler shift of a MP signal is different from a Doppler shift of a line of sight (LOS) signal. The Doppler shift of the MP signal due to the movement of the receiver can be opposite to the Doppler shift of the LOS signal, in some cases. In this case, if the LOS signal is shielded, or otherwise blocked, and the MP signal is received, the opposite Doppler measurement result will lead to an incorrect velocity and direction, and further lead to a potentially large error during navigation. Therefore, it is desirable to screen out poor Doppler measurement results before PVT calculation.

The background description provided above is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure provides a method and apparatus for detecting bad (e.g., inaccurate, including errors) Doppler measurement results, and more particularly provides a method for detecting bad Doppler measurement results that are affected by a multipath signal interference that may not be detected by using existing measurement accuracy methods.

In general, one or more aspects of the subject matter described in this specification can be embodied in one or more methods that include: calculating a first Doppler shift value, wherein the first Doppler shift value is based on movement of a Global Navigation Satellite System (GNSS) receiver and calculated according to a Doppler measurement result; calculating a second Doppler shift value, wherein the second Doppler shift value is based on movement of the GNSS receiver and calculated according to a projection of velocity of the GNSS receiver on a line of sight (LOS) vector; comparing the first Doppler shift value with the second Doppler shift value to check an accuracy of the Doppler measurement result; and determining at least a direction of movement of the GNSS receiver in accordance with the checked accuracy of the Doppler measurement result. These and other embodiments can optionally include one or more of the following features.

Particular embodiments of the subject matter described in this specification can be implemented to realize one or more of the following advantages. The techniques and systems described realize a Doppler measurement accuracy solution that improves positioning operations, such as PVT, by addressing multipath interference prior to performing positioning calculations. The techniques and systems described leverage a correlation between multipath interference and Doppler shift, so as to detect potential erroneous Doppler measurements due to multipath signal interference conditions, such as can occur in urban areas or other environments. Additionally, the techniques described can detect multiple bad Doppler measurements, which extends error detection capabilities to multiple GNSS signals in GNSS environments that employ multiple GNSS satellites (e.g., satellite constellation).

The details of one or more embodiments of the subject matter described in this specification are set forth in the accompanying drawings and the description below. Other features, aspects, and advantages of the invention will become apparent from the description, the drawings, and the claims.

DRAWING DESCRIPTIONS

Like reference numbers and designations in the various drawings indicate like elements.

DETAILED DESCRIPTION

Figure 1:
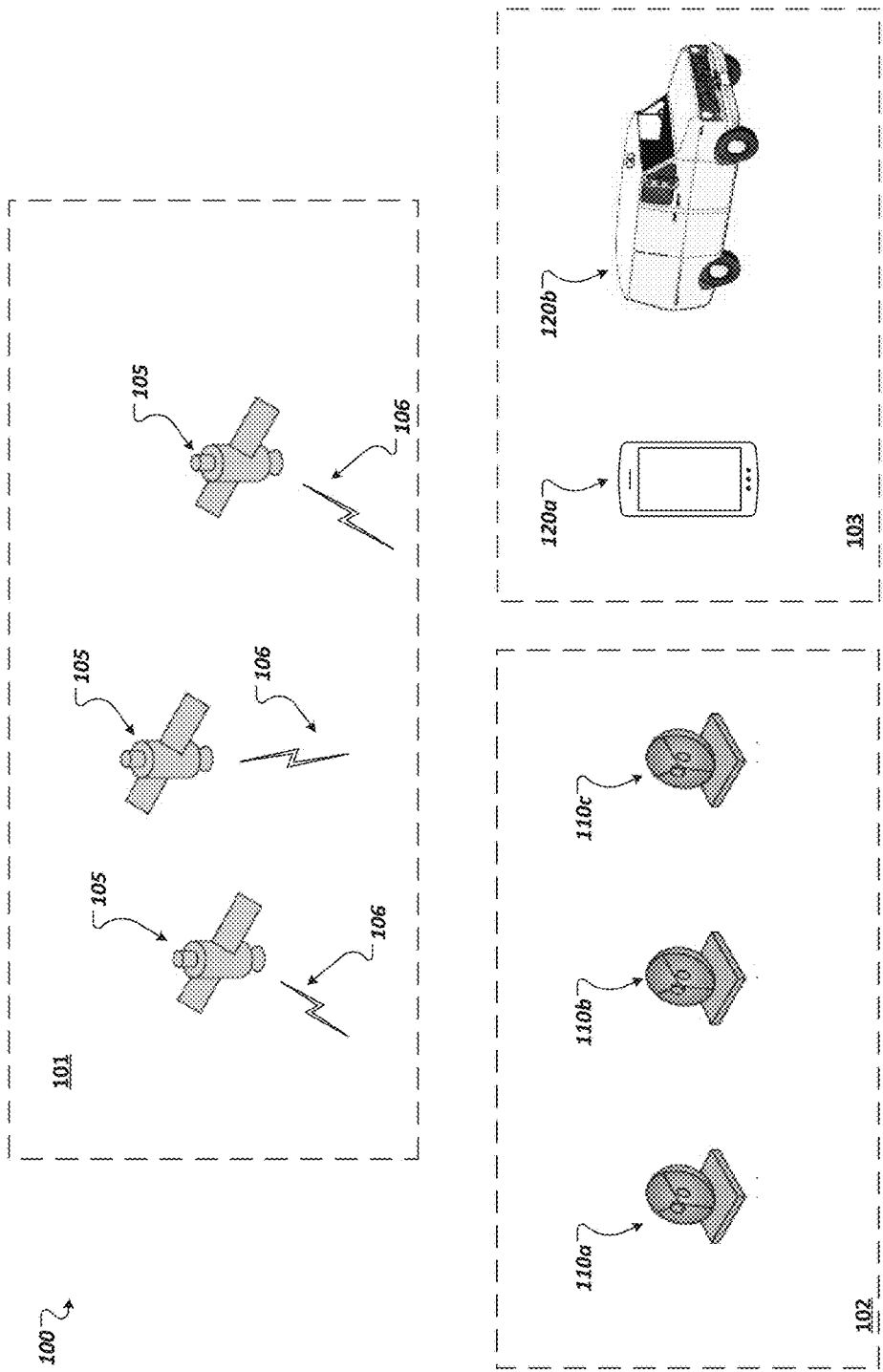
FIG. 1 shows an example of a GNSS satellite system.

This disclosure provides details and examples of methods and systems for determining a quality of a Doppler measurement by comparing a Doppler shift that is due to movement of a GNSS receiver (which is calculated according to a Doppler measurement result) with a Doppler shift that is due to movement of the GNSS receiver (which is calculated according to a historical velocity of the receiver). The GNSS is satellite tracking technology that is currently implemented using four different satellite technologies: Global Positioning System (GPS), GLObal NAvigation Satellite System (GLONASS), BeiDou Navigation Satellite System (DBS), or Galileo. Each of the technologies consists mainly of three segments: space segment 101, control segment 102, and user segment 103, which are shown in FIG. 1. These segments are similar in the three different current satellite technologies.

According to some implementations, Doppler measurements are supported by a GNSS system 100 (e.g., a GPS system). For example, Doppler measurements are employable to evaluate a velocity and acceleration, leading to accuracies of the order of a few millimeters per second. Therefore, GNSS-based Doppler capabilities can provide a stable reference, thereby making GNSS receivers a suitable alternative for positioning mechanisms such as speedometers and/or accelerometers and GNSS capabilities (e.g., navigation) as implemented in devices in the GNSS user segment 103, illustrated as cellular phone 120a and vehicle 120b. In some instances, reflected signals interfere with reception of the GNSS signals 106 transmitted from the satellites 105. For example, multipath interference, or multipath, causes a signal 106 to be received via multiple paths or completely blocks the signal 106 (e.g., only a reflected signal is received). Multipath interference can be common in a GNSS system 100 with environments in dense urban areas where tall buildings block signals. Additionally, it is possible for the existence of MP interference to extend beyond urban areas. For example, MP signal interference may occur in any area having buildings, especially near tall buildings with glass exterior walls, for example. MP signal interference can also exist in areas including clusters or dense grouping of tall objects, such as in a forest. Thus, the bad Doppler measurement detection techniques described herein realize a solution that improves positioning operations, such as PVT, (e.g., in urban areas) by addressing multipath interference. Multipath interference also affects the carrier-phase, Doppler shift, and carrier-power-to-noise-density ratio measurements, for example. The techniques described herein leverage this correlation between multipath and Doppler shift, so as to detect potential erroneous Doppler measurements due to multipath signal interference.

FIG. 1 depicts the space segment 101 consisting of satellites 105, each transmitting a GNSS carrier signal 106. For example, the GNSS satellites 105 and GNSS receivers, which are included in cellular phone 120a and vehicle 120b, can be used for the acquisition and tracking of many direct-sequence spread-spectrum (DS/SS) signals as used in GNSS. Specifically, FIG. 1 shows an example of GNSS for the acquisition and tracking of signals from GPS satellites. Accordingly, an embodiment will be described in an application of acquiring and tracking signals from GPS satellites with signals in the presence of multipath.

As shown in FIG., multiple satellites 105 can form a GPS constellation in the space segment 101 that keeps time with atomic clocks aboard. A satellite 105 can transmit a radio frequency (RF) signal 106 at several frequencies including L1 (i.e., 1575.42 MHZ) and L2 (i.e., 1227.60 MHZ), for example. Each signal 106 carries information on its in-phase and quadrature components. The signal 106 components can be phase-modulated, generating a modulated carrier signal with at least one pseudo random number (PRN) code and known as the spectrum spreading code. Some signals 106 are further modulated with a navigation data message that provides the precise satellite orbital, clock, and other information. For example, spectrum-spreading codes can be unique for a satellite 105 and used as the identifier for that satellite. The navigation data included in a carrier signal 106 can convey one or more parameters necessary for determining the satellite position and the corrections required for increasing the pseudorange precision. As an example, the navigation message is obtained, or otherwise obtained, from the signal 106 by recovering the bits through modulating the signals transmitted by the satellites 105.

The control segment 102 includes a master control station 110a, data uploading station 110b, and monitor station 110c. The master control station 110a operates to adjust control parameters for the satellites 105, such as orbit parameters and onboard clocks. The monitor station 110c can monitor satellite 105 signals and statuses, and relay them to the master control station 110a. The data uploading station 110b can receive correction information, such as time corrections and orbit corrections, from the master control station 110a. The user segment 103 includes devices that are configured to incorporate GNSS receivers, for example, in order to receive GNSS signals transmitted from satellites 105. Using GNSS receiver capabilities, a device of user segment 103 receives and processes signals 106 from the GNSS satellites 105 and uses these received signals to derive and apply location and time information, for instance. The devices employable in the GNSS user segment 103 range from mobile receivers, shown as cellular phone 120a, to specialized receivers used for complex navigation and mapping applications used by vehicle 120b, for example.

Figure 2:
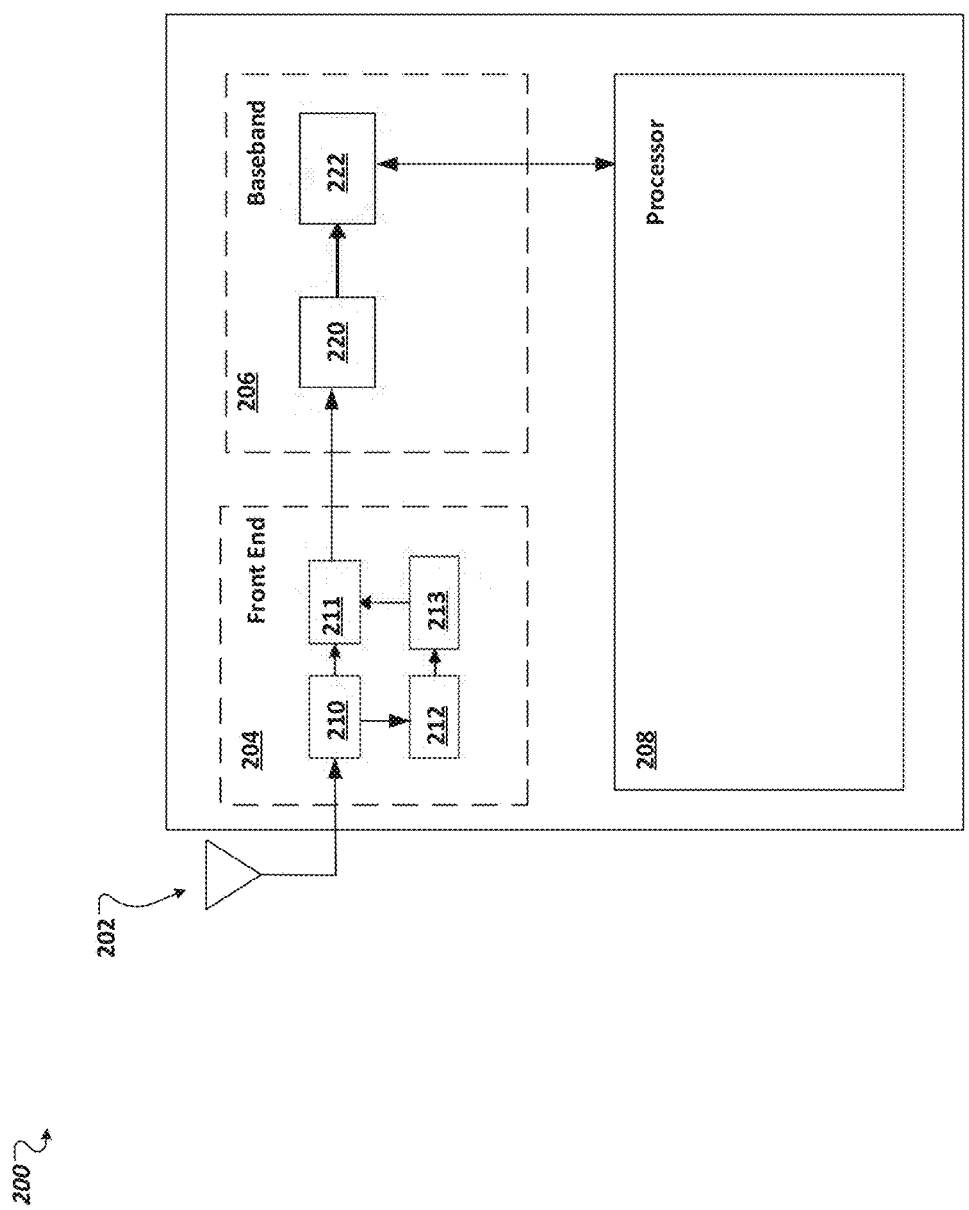
FIG. 2 shows an example a GNSS receiver usable in the GNSS system.

FIG. 2 shows an example of a GNSS receiver 200 used according to the bad Doppler detection techniques of the embodiments. A GNSS receiver 200 is usable in the GNSS system (shown in FIG. 1) to receive and process a GNSS signal transmitted from a GNSS satellite. For example, the GNSS receiver 200 can receive a RF signal, and perform signal processing functions in order to measure a propagation delay (range) and Doppler frequency shift (range rate) of each received GNSS signal and to demodulate the navigation data. The GNSS receiver 200 includes circuitry that is generally grouped into three main parts that respectively serve generally different functions: front end circuitry 204 is configured to process GNSS signals received over one or more antennas 202 for signal processing operations; baseband circuitry 206 is configured to process the down-converted and digitized GNSS signals in order to provide observables, such as codes and carrier measurements; and processor circuitry 208 is configured to process GNSS based calculations, such as navigation data decode, bad Doppler measurement detection, and PVT.

The antenna 202 receives GNSS signals transmitted from a source, such as a satellite. For example, radio frequency (RF) signals of GPS satellites in view of the GNSS receiver 200 are received by antenna 202 with nearly hemispherical (i.e., above the local horizon) gain coverage. In some implementations, the antenna 202 is an L-band antenna, capturing GNSS signals. Additionally, the antenna 202 potentially captures noise and possible interference, such as multipath interference which increases the likelihood of errors in received signals. The RF signals transmitted to the antenna 202 are propagated to the components of the front end circuitry 204 for RF processing. Upon reception, a GNSS signal tends to have low power, therefore the signal is initially input into a low-noise amplifier (LNA) 210. The signal is amplified by LNA 210 (e.g., preamp), which effectively sets a noise figure of the receiver. In some implementations, the front end can include a passive bandpass prefilter between the antenna 202 and the LNA 210 to minimize out-of-band RF interference. Although the implementation itself varies between architectures and hardware realizations in GNSS receivers, the principle is the same: the received signal is amplified, keeping the noise figure low and rejecting possible out-of-band interference. Thereafter, the amplified and conditioned signals are then down-converted to intermediate frequencies (IF) using signal mixing frequencies from local oscillator (LO) 212. The LO 212 is derived from the reference oscillator by a frequency synthesizer 213, based on the frequency plan of the receiver design. The frequency synthesizer 213 provides the receiver with time and frequency reference for all the front end components. For example, one LO 212 per down-converter stage is used. In some implementations, a two-stage down-conversion to IF is used, and moreover one-stage down-conversion and even direct L-band digital sampling is employable. The signal Dopplers and the PRN codes are preserved after the mixing process during down-conversion. A carrier frequency can be lowered, but the Doppler remains referenced to the original L-band signal. In some implementations, automatic gain control (AGC) functions also take place at IF, and the AGC functions are responsible for adjusting the gain of the front end circuitry 204 in order to take benefit from the full dynamic range.

An analog-to-digital conversion process for signal quantization is performed by the front end circuitry 204 using an analog to digital convertor (ADC) 211. The incoming signals are digitized through the ADC 211 ensuring that quantization errors and dynamic ranges are appropriate to accommodate the signal's characteristics. As output from the ADC 211, the digitized IF signals are transmitted to the baseband circuitry 206 for further signal processing.

The baseband circuitry 206 receives the down-converted and digitized GNSS signal from the front end circuitry 204, and processes the signal to retrieve observables and employs several signal processing routines to acquire and track the carrier of GNSS signal. As an example, the baseband circuitry 206 uses several independent channels, where each channel individually tracks each respective satellite signal in order to provide GNSS observables and navigation data. Then, the data from each channel is integrated to derive a navigation solution.

The incoming signal to the baseband circuitry 206 is correlated using correlators 220. Correlation is usable to search for the satellites in view of the receiver 200. For instance, as the GNSS receiver 200 starts operating, and it determines which satellites are in view and can be tracked for extracting measurements, or acquisition. The GNSS signals are transmitted by moving satellites, thus there is a Doppler and code delay effect observed in the received signals at the GNSS receiver 200. Therefore, in detecting GNSS signals, the amount of delay and relative motion between the transmitted signal and the receiver 200 are unknown. In order to search for the GNSS signals, different local replicas, corresponding to different code delay/Doppler frequency pairs, are generated and correlated with the input signals. Correlators 220 accomplish correlation with one or more PRN code replicas that are generated in the receiver 200 taking into account the signal carrier frequency, code delay, Doppler frequency, and PRN code (which is unique to each satellite/signal). In some embodiments, the signal is stripped of its Doppler frequency prior to correlation.

The incoming signal is repeatedly correlated using correlators 220 with the replica of the expected PRN code, which is known a priori. Then new estimations of the Doppler frequency and code delay are computed based on the assessment of the correlation outputs. As an example, a replica and the incoming signal are aligned, their correlation generates a peak and the code delay/Doppler frequency pair corresponding to the peak is assumed to be a good estimate to initialize the tracking process. Correlations are also used by the correlators 220 to refine the local replica generation, so as to match as best as possible the incoming signal. The correlation results are then applied to support different tracking loops in providing a measurement of tracking quality.

Baseband circuitry 206 employs various tracking loop algorithms to find and follow a visible GNSS signal, by means of synchronization with the known PRN code. Tracking loops 222 implement GNSS tracking functions in an iterative way. For example, the tracking loops 222 are implemented as phase lock loops (PLL) or frequency lock loops (FLL) to track the incoming signal's phase and frequency, respectively. Thus, in some implementations the tracking loop 222 of the GNSS receiver 200 is one of either the PLL or the FLL. In some implementations, the tracking loops 222 include both PLL and FLL tracking algorithms. The PLL provides the carries phase and Doppler of GNSS signals, and the FLL provides the Doppler of GNSS signals. As an example, a raw Doppler measurements are generated directly from the PLL or FLL. The GNSS receiver 200 tracks each signal using dedicated channels in parallel, where each channel tracks one signal (i.e., for single frequency users, each channel tracks one satellite), providing pseudorange and phase measurements, as well as navigation data and additional signal information, such as carrier-to-noise ratio.

The GNSS receiver 200 includes processor circuitry 208 that is configured to receive and process data extracted from a signal by the baseband circuitry 206, to perform navigation monitoring and control features, for example. The processor circuitry 208 processes the information from the tracking loops for different applications from computing position and velocity, performing time transfer, and collecting data to be post-processed by ground stations. Additionally, processor circuitry 208 implements numerous mathematical calculation and solving functions, such as calculations including but not limited to: navigation data decode; bad Doppler measurement detection; and receiver's PVT calculation. The processing circuitry 208 can also be configured to execute software for specific user applications, such as user interfaces and GPS navigation depending on the desired function of the receiver 200, for example a GNSS receiver implemented in a cellular phone. The GNSS receiver performs different tasks with the resulting GNSS information, and provides meaningful results to the user. In the example of a cellular phone, the application processor (AP) of the phone is usable as the processor circuitry 208 of the GNSS receiver 200. The processor circuitry 208 suitably is a System on Chip (SoC), which includes one or more integrated circuit (IC) devices. In an implementation of the GNSS receiver 200, the front end circuitry 204, baseband circuitry 206, and processor circuitry 208 can be integrated on a single IC device or multiple IC devices that are coupled with each other directly or that are disposed on a common circuit board. For example, the front end circuitry 204, baseband circuitry 206, and processor circuitry 208 are integrated in a single application-specific integrated circuit (ASIC) chip. Alternatively, the front end circuitry 204 and baseband circuitry 206 are integrated in a single ASIC chip, and the processor circuitry 208 can be shared with other devices to reduce costs, for instance.

In addition, in accordance with various embodiments, the processor circuitry 208 includes one or more processors, and one or more additional dedicated processing units to perform signal processing capabilities, for example. In some implementations, the processor circuitry 208 includes circuitry for at least one Digital Signal Processor, at least one Micro-Controller Unit (MCU), and at least one memory (Mem) device to hold data and potentially instructions for the MCU. Many variations on the details of the architecture of the processor circuitry are possible.

Figure 3:
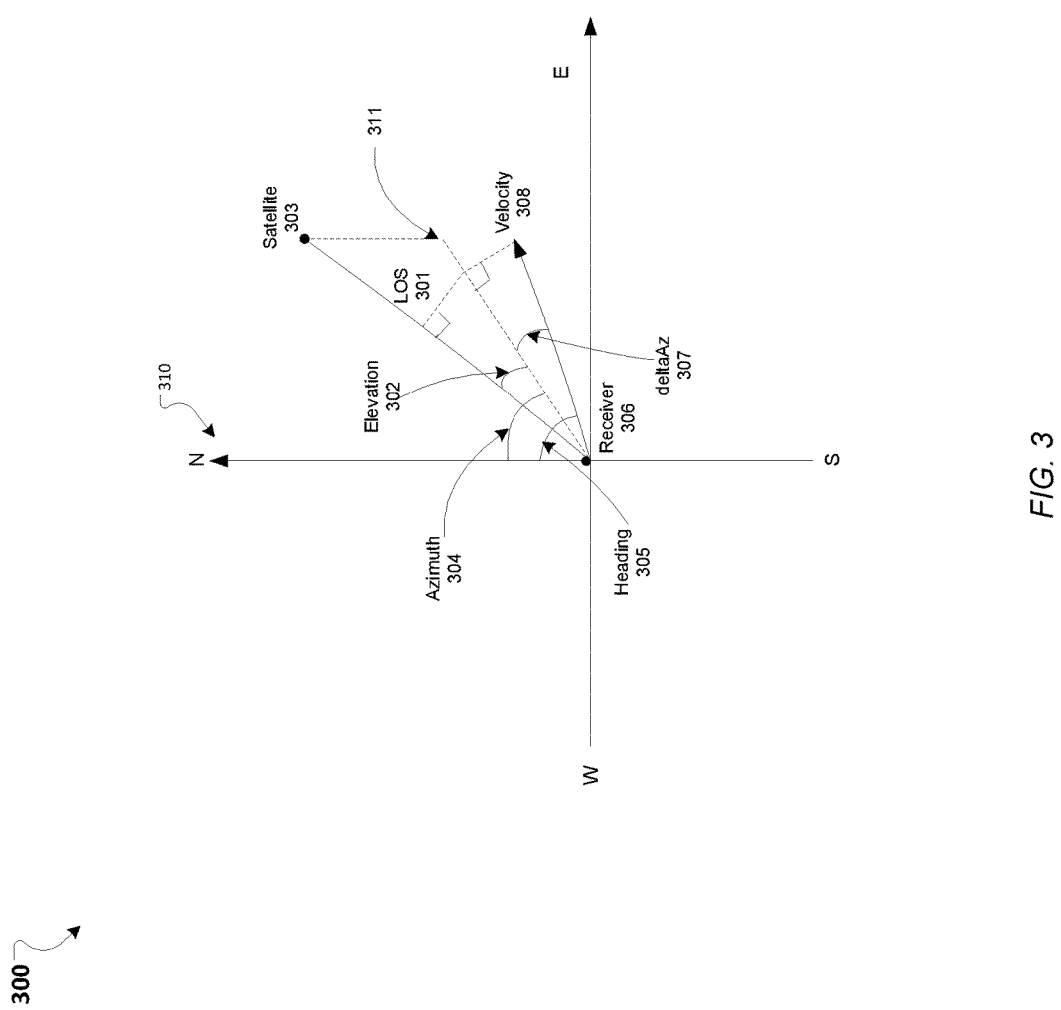
FIG. 3 shows a graph representation of an example of a projection of receiver velocity on a Line-Of-Sight (LOS) vector in a coordinate system.

FIG. 3 shows a graph representation 300 of an example of a projection of GNSS receiver velocity 308 on a LOS vector 301. The projection of receiver velocity 308 on the LOS vector 301 is used according to the described bad Doppler detection techniques (described in connection with FIG. 4) to calculate Doppler shift due to movement of the GNSS receiver. As an example, Doppler shift affects the frequency of the signal from a GNSS satellite that is received by the GNSS receiver based on the movement of the satellite in relation to motion of the receiver. The Doppler shift can be characterized as the difference in the frequencies between the transmitted signal (e.g., from the satellite) and the received signal (e.g., at the receiver). In order to address signaling accuracy issues, determining a velocity of the GNSS components (i.e., GNSS receiver and GNSS satellite) can be advantageous in calculating the Doppler shift due to the movement of the GNSS receiver, and further to detecting erroneous Doppler measurements.

In some existing GNSS positioning technologies, a receiver velocity is estimated by using time-differenced carrier waves and Doppler measurements related to user-satellite motion, such as differencing two consecutive positions (e.g., precise position change) and instantaneous velocity calculations. Additionally, based on a satellite position and velocity, it is possible to indicate a relative velocity component for the receiver projected along a LOS vector.

As shown in FIG. 3, the positioning of GNSS receiver 306 and GNSS satellite 303 are illustrated on a coordinate system 310, where the respective locations are representable using coordinates, such as the Earth-Centered, Earth Fixed (ECEF) X, Y, Z coordinates. The LOS is related to a signaling visibility between components, for example, the transmission path for a signal to travel between a satellite 303 and the receiver 306. The LOS vector 301 is shown as having a starting point at the origin, which is also the location of the receiver 306. Additionally, the LOS vector 301 is illustrated as having a magnitude characterized by the distance between the GNSS satellite 303 and the GNSS receiver 306 and a direction component represented by the angular measurement on the horizontal W-E plane, heading angle 305. A midpoint line 311 between the angle formed from the LOS vector 301 and the projected velocity 308 is shown from the origin at the receiver 306, and through the point of intersection of the perpendicular bisectors of the LOS vector 301 and the velocity 308. The midpoint line 311 is shown as an angle bisector separating the two angular measurements elevation angle 302 (i.e., angle between the LOS vector 301 and the midpoint line 311) and the deltaAZ angle 307.

In some implementations, by using GNSS receiver 306 and GNSS satellite 303 coordinate positions (e.g., X ECEF, Y ECEF, and Z ECEF) in ECEF frame, the elevation angle 302, Azimuth angle 304, heading angle 305, and deltaAz 307 can be determined. The Azimuth angle 304, as illustrated in FIG. 3, is an angle of deviation of the receiver's 306 forward (y) axis from north, measured clockwise in the E-N plane that is a horizontal angle from true north to the midpoint line 311. Accordingly, the deltaAz angle 307 is shown as the angular difference between the heading, or direction, 305 and the azimuth angle 304.

Based on the determined angles, positions, and vectors associated with the GNSS satellite 303 and GNSS receiver 306, and in particular the projection of the receiver velocity 308 on the LOS vector 301, the Doppler shift related to the receiver motion is calculated. For example, a velocity vector can include a vertical speed, and elevation. Thus, the LOS vector 301 can be used to represent the rate of change of the position of the receiver 306, where the magnitude of the velocity vector 308 is a speed of movement for the GNSS receiver and the direction of the vector signifies its directional movement. Calculating the Doppler caused by GNSS receiver motion based on the projection of the receiver velocity on the LOS vector can be represented mathematically as:

$$\tilde{dr}_{rcv}^{j}(n) = v_{rcv}(n)\cos(ele^{j}(n))\cos(\text{deltaAz}^{j}(n)) \quad (1)$$

Figure 4:
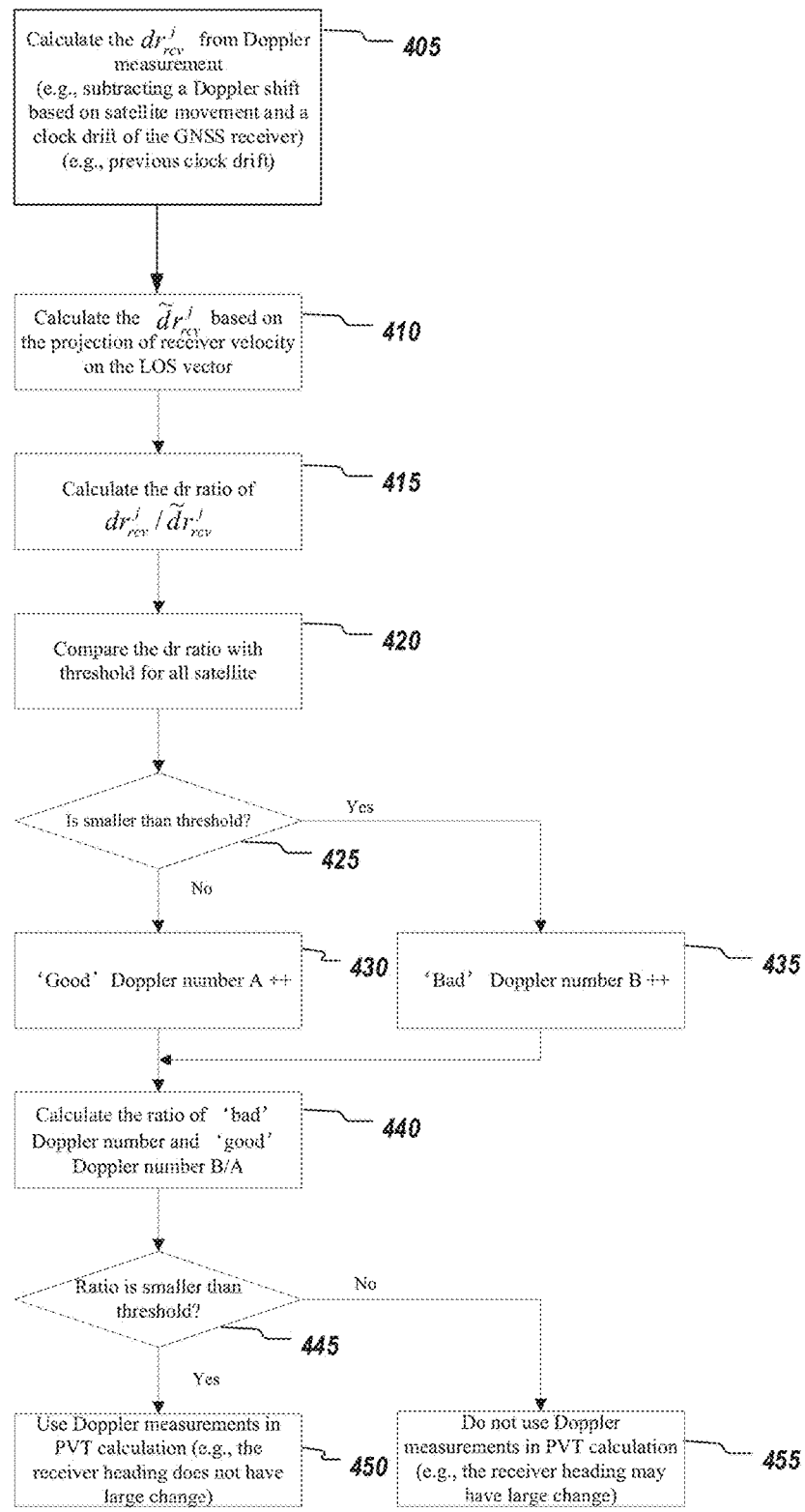
FIG. 4 shows an example of a process for detecting a poor quality Doppler measurement in GNSS navigation.

FIG. 4 shows an example of a process for detecting poor Doppler measurement results in GNSS navigation. The method illustrated in FIG. 4 can be used to compare a first Doppler shift, which is calculated based on a Doppler measurement, with a second Doppler shift, which is alternatively calculated based on the projection of velocity on the LOS vector. The two Doppler shift measurements are then used to check whether the obtained Doppler measurement result is correct. In considering the Doppler shifts calculated by the different algorithms, the technique effectively detects erroneous Doppler measurements that have been affected by some signal interference conditions. For example, the techniques described can detect bad Doppler measurements resulting from GNSS signals that are affected by multi-path interference signals, which is an error condition that cannot be appropriately detected by some existing systems and techniques for determining the accuracy of Doppler measurements. Additionally, the technique described overcomes limitations related to detecting only a single bad Doppler measurement, which potentially leaves any additional errors undetected in GNSS environments that employ multiple GNSS satellites. In contrast, the method shown in FIG. 4, for example, performs a detection for multiple Doppler measurements, such as measurements obtained from multiple GNSS satellites (e.g., GNSS constellation).

As an example, a Doppler measurement is related to the movement of a GNSS satellite, movement of the GNSS receiver, and a clock drift of the GNSS receiver. Therefore, the Doppler shift caused by receiver motion can be calculated by subtracting the Doppler shift due to satellite motion and the clock drift of the receiver from the Doppler measurement result. Also, the Doppler shift due to movement of the GNSS receiver can be calculated according to the projection of velocity on the LOS vector. In order for a Doppler measurement result to be indicated as being of a "good" quality (e.g., low or negligible error), the two Doppler shifts caused by receiver motion that are calculated by using the above two methods should have the same sign (plus or minus). Otherwise, the Doppler measurement is considered to contain errors causing the result to be identified as a "bad" Doppler measurement, for example potentially impacting navigation calculations.

Referring now to FIG. 4, at 405, the first Doppler shift $dr_{rcv}^{j}(n)$ due to movement of the GNSS receiver is calculated from an obtained Doppler measurement. As an example, a raw Doppler measurement can be obtained from the phase lock loop (PLL) or frequency lock loop (FLL) of the GNSS receiver. The GNSS receiver uses PLL and FLL to track a carrier of GNSS signals. The PLL can provide the carrier phase and Doppler of GNSS signals, and the FLL can provide the Doppler of GNSS signals. Using a known Doppler measurement, the Doppler shift $dr_{rcv}^{j}(n)$ is obtained by subtracting the Doppler shift due to satellite movement and the clock drift of the GNSS receiver from the Doppler measurement result. The obtained Doppler measurement result can be expressed mathematically by:

$$dr_{me}^{j}(n) = dr_{sv}^{j}(n) + dr_{rcv}^{j}(n) + \text{drift}(n) \quad (2)$$

where in $dr_{me}$ is the Doppler measurement result;
$dr_{sv}$ is a Doppler shift due to satellite movement;
$dr_{rcv}$ is a Doppler shift due to movement of a receiver;
drift is a clock drift of the receiver;
j represents the jth satellite; and
n represents the nth epoch navigation.

Then, from the obtained Doppler measurement result, the Doppler shift caused by receiver motion $dr_{rcv}$ is calculated. Using the abovementioned Doppler measurement result equation, the Doppler shift due to movement of the GNSS receiver is obtained through the following calculation:

$$dr_{rcv}^j(n) = dr_{me}^j(n) - dr_{sv}^j(n) - \text{drift}(n) \tag{3}$$

Calculating $dr_{rcv}^j$ includes additionally calculating a Doppler drift due to movement of the satellite and determining a receiver clock drift. The position of the GNSS satellite and velocity of the satellite are known. For instance, in receiving a transmission time from a broadcast navigation message, the satellite coordinates can be computed using the earth-fixed Earth-Centred, Earth-Fixed (ECEF) coordinate frame and used to determine the satellite's position and velocity. Also, the user position (e.g., receiver) is known in the operation process. With these known variables, the Doppler shift caused by the satellite motion $dr_{sv}$ can be calculated according to the following formula:

$$dr_{sv}^j(n) = [(x^j(n)-x(n))v_x^j(n) + (y^j(n)-y(n))v_y^j(n) + (z^j(n)-z(n))v_z^j(n)]/R(n) \tag{4}$$

where $x^j$, $y^j$, and $z^j$ are positions of the satellite in ECEF coordinates;
$v_x^j$, $v_y^j$, $v_z^j$, are velocity of the satellite in ECEF coordinates;
x, y, and z are positions of the receiver in ECEF coordinates;
R is a geometric distance between the satellite and the receiver;
j represents the jth satellite;
n represents the nth epoch of navigation.

In some instances, the clock drift associated with the GNSS receiver does not change within a short period of time. Therefore, a previous clock drift drift(n−1) value is used in place of a clock drift of the current epoch of navigation drift(n), which may not be known, to calculate the Doppler shift caused by receiver motion $dr_{rcv}^j(n)$. Additionally, in some implementations, a smooth value of the clock drift in a previous short period of time is used in place of drift(n) to calculate $dr_{rcv}^j(n)$.

Calculating a second Doppler shift at 410 due to movement of the receiver $\tilde{dr}_{rcv}^j(n)$ according to the projection of the velocity of the receiver on a LOS vector, as described in connection with FIG. 3, which illustrates a graph representation of the projection of the velocity of the GNSS receiver on the LOS vector. Calculating the first Doppler shift value and the second Doppler shift value can be performed by processor circuitry of the GNSS receiver sequentially, for example, the second Doppler shift value is calculated after the first Doppler shift value. In some implementations, the calculation is performed in a reverse order than that shown in FIG. 4. For instance, the first Doppler shift value can be calculated after the second Doppler shift value. In some implementations, a parallel processing approach can be used to calculate both Doppler shift values in parallel.

As previously discussed, the Doppler shift based on the projection of receiver velocity on the LOS vector can be represented mathematically as:

$$\tilde{dr}_{rcv}^j(n) = v_{rcv}(n)\cos(ele^j(n))\cos(\text{deltaAz}^j(n)) \tag{5}$$

where $v_{rcv}$ is the velocity of the receiver;
deltaAz$^j$(n)=heading(n)−Az$^j$(n) is a difference angle between the heading of receiver and satellite azimuth;
ele is an elevation of the satellite;
j represents the jth satellite; and
n represents the nth epoch of navigation.

Calculating the second Doppler shift at 410 involves setting the velocity of the receiver $v_{rcv}(n)$ to 1. Also, historical velocity information for the GNSS receiver, namely a previous heading, or direction, of the receiver heading(n−1), is used to calculate the Doppler shift $\tilde{dr}_{rcv}^j(n)$ in place of the receiver heading(n) from the current epoch of navigation. In some implementations, a smooth value of the receiver heading in a previous short period of time is used to replace heading(n) to calculate $\tilde{dr}_{rcv}^j(n)$.

After determining the Doppler shift values respectively resulting from both techniques (i.e., Doppler measurement result and LOS vector) a ratio is calculated at 415 using those Doppler shift values. As shown in FIG. 4, the ratio calculation at 415 includes using the first Doppler shift value $dr_{rcv}^j(n)$ as the numerator and the second Doppler shift value as the denominator. In some implementations, the ratio can be inversed. The processes is employed for error detection of multiple Doppler measurements associated with multiple satellites in a GNSS system (shown in FIG. 1) for example, and a ratio of the Doppler shift values is calculated for each satellite respectively and compared at 420 with a threshold. As an example, the threshold of −1 m/s is used in the comparison, and a ratio of any two values with the same sign (e.g., positive or negative) will have a positive quotient and be greater than the threshold. Conversely, Doppler shift values with opposing signs will have a ratio that is equal to or less than the threshold. The threshold is a value usable to determine whether the first Doppler shift value and the second Doppler shift value have the same sign or opposite signs, which indicates an error in the Doppler measurement. For example, in conditions where the heading, or direction, of the GNSS receiver remains unchanged and the receiver does not have a high vertical velocity, it is assumed that the Doppler shift based on the Doppler measurement result is proportional to the Doppler shift based on the LOS vector for each satellite, if the Doppler measurement has no error (e.g., LOS is not blocked, MP signal is not received). Therefore, for a "good" Doppler measurement result, $\tilde{dr}_{rcv}^j(n)$ and $dr_{rcv}^j(n)$ have the same sign; and for a "poor" Doppler measurement result, especially for satellite signals that are affected by a MP signal which can cause the Doppler measurement to be reversed, $\tilde{dr}_{rcv}^j(n)$ and $dr_{rcv}^j(n)$ will have opposite, or reverse, signs.

A check at 425 is used to determine whether the calculated ratio for the respective satellite is smaller than the threshold. In the instance when the ratio is smaller, shown in FIG. 4 as "Yes", the Doppler measurement for the particular satellite is considered "Bad", and a counter representative of a number of bad Doppler measurements (e.g., "Bad" Doppler number B) is incrementally increased at 435, by one for example. Otherwise, in the instance when the compared ratio is larger than the threshold, shown in FIG. 4 as "NO", the Doppler measurement for the particular satellite is considered "Good" and a counter for good Doppler measurements (e.g., "Good" Doppler number A) is increased at 430.

Thereafter, the process proceeds to calculate an additional ratio at 440 of the "Bad" Doppler number to the "Good" Doppler number (i.e., B/A), and at 445 compares the ratio with another threshold related to the quality of Doppler for a total number of satellites. As an example, in a GNSS constellation of 11 satellites, 2 satellites transmit signals that are determined to produce "Bad" Doppler measurements at the GNSS receiver and 9 satellites transmit signals associated with "Good" Doppler measurements. Therefore, the calculated ratio for B/A=2/9, indicating that a majority of the Doppler measurements results may have an error. Further in the example, the check at 445 is used to determine whether the ratio of detected "Bad" Doppler to "Good" Doppler is smaller than the threshold, or comparing 2/9 (e.g., B/A) to 1/5 (e.g., threshold).

Based on the performed comparison, in the event that the ratio is smaller than the threshold, which is shown in FIG. 4 as "Yes", it serves as an indication that most, or otherwise acceptable amount of Doppler measurements are good, and that the heading of the receiver does not have substantially large change. Conversely, in the instances where many, or an unacceptable amount of Doppler measurements are "Bad" and potentially having error with very high probability, the Doppler measurements are not used in PVT calculation, shown in 450. For example, a Doppler quality ratio of 4/7 is larger than the example threshold 1/4, and indicated by "No" shown in FIG. 4 in relation to the check at 445, thus indicating that the receiver heading may have big change. As an example, a car receiving navigation instructions based on PVT calculations using such poor quality Doppler measurements having a high error probability may make an improper turn in these conditions because the detection is invalid. Therefore, the techniques realize a solution that not only detects Doppler error based on MP interference, but prevents these Doppler measurement errors from propagating and causing additional errors in GNSS navigation.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more processors to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
calculating a first Doppler shift value, wherein the first Doppler shift value is based on movement of a Global Navigation Satellite System (GNSS) receiver and calculated according to a Doppler measurement result;
calculating a second Doppler shift value, wherein the second Doppler shift value is based on movement of the GNSS receiver and calculated according to a projection of velocity of the GNSS receiver on a line of sight (LOS) vector;
comparing the first Doppler shift value with the second Doppler shift value to check an accuracy of the Doppler measurement result,
wherein comparing the first Doppler shift value with the second Doppler shift value comprises calculating a ratio of the first Doppler shift value to the second Doppler shift value and comparing the ratio to a threshold; and
determining at least a direction of movement of the GNSS receiver in accordance with the checked accuracy of the Doppler measurement result.

2. The method of claim 1, wherein the checked accuracy of the Doppler measurement result is indicated as good if the calculated ratio is larger than the threshold or indicated as bad if the calculated ratio is smaller than the threshold.

3. The method of claim 1, wherein threshold is a value usable to determine whether the first Doppler shift value and the second Doppler shift value have a same sign or opposite signs under an effect of a multipath (MP) signal.

4. The method of claim 1, wherein the determining comprises calculating position, velocity, and time (PVT) for navigation using the Doppler measurement result.

5. The method of claim 1, wherein calculating the first Doppler shift value comprises subtracting a Doppler shift based on satellite movement and a clock drift of the GNSS receiver from the Doppler measurement result.

6. The method of claim 5, wherein the clock drift is a last clock drift.

7. The method of claim 1, wherein calculating the second Doppler shift value comprises using a direction of the GNSS receiver and a velocity of the GNSS receiver.

8. The method of claim 7, wherein calculating the second Doppler shift value comprises setting the line of sight (LOS) vector to 1 and using a previous direction of the GNSS receiver as the direction of the GNSS receiver.

9. The method of claim 1, comprising:
calculating additional first Doppler shift values and additional second Doppler shift values corresponding to each satellite of a plurality of satellites;
calculating a ratio for each satellite, wherein the ratio is of each respective additional first Doppler shift value to the additional second Doppler shift value corresponding to each satellite of the plurality of satellites; and
comparing the ratio to a threshold for each satellite of the plurality of satellites.

10. A method comprising:
calculating a first Doppler shift value, wherein the first Doppler shift value is based on movement of a Global Navigation Satellite System (GNSS) receiver and calculated according to a Doppler measurement result;
calculating a second Doppler shift value, wherein the second Doppler shift value is based on movement of the GNSS receiver and calculated according to a projection of velocity of the GNSS receiver on a line of sight (LOS) vector;
comparing the first Doppler shift value with the second Doppler shift value to check an accuracy of the Doppler measurement result;
determining at least a direction of movement of the GNSS receiver in accordance with the checked accuracy of the Doppler measurement result;
calculating additional, first Doppler shift values and additional second Doppler shift values corresponding to each satellite of a plurality of satellites;
calculating a ratio for each satellite, wherein the ratio is of each respective additional first Doppler shift value to the additional second Doppler shift value corresponding to each satellite of the plurality of satellites; and
comparing the ratio to a threshold for each satellite of the plurality of satellites.

11. The method of claim 10, wherein threshold is a value usable to determine whether the first Doppler shift value and the second Doppler shift value have a same sign or opposite signs under an effect of a multipath (MP) signal.

12. The method of claim 10, wherein the determining comprises calculating position, velocity, and time (PVT) for navigation using the Doppler measurement result.

13. The method of claim 10, wherein calculating the first Doppler shift value comprises subtracting a Doppler shift based on satellite movement and a clock drift of the GNSS receiver from the Doppler measurement result.

14. The method of claim 13, wherein the clock drift is a last clock drift.

15. The method of claim 10, wherein calculating the second Doppler shift value comprises using a direction of the GNSS receiver and a velocity of the GNSS receiver.

16. The method of claim 15, wherein calculating the second Doppler shift value comprises setting the line of sight (LOS) vector to 1 and using a previous direction of the GNSS receiver as the direction of the GNSS receiver.

17. A method comprising:
calculating a first Doppler shift value, wherein the first Doppler shift value is based on movement of a Global Navigation Satellite System (GNSS) receiver and calculated according to a Doppler measurement result;
calculating a second Doppler shift value, wherein the second Doppler shift value is based on movement of the GNSS receiver and calculated according to a projection of velocity of the GNSS receiver on a line of sight (LOS) vector,
wherein calculating the second Doppler shift value comprises using a direction of the GNSS receiver and a velocity of the GNSS receiver, and
wherein calculating the second Doppler shift value comprises setting the line of sight (LOS) vector to 1 and using a previous direction of the GNSS receiver as the direction of the GNSS receiver;

comparing the first Doppler shift value with the second Doppler shift value to check an accuracy of the Doppler measurement result; and determining at least a direction of movement of the GNSS receiver in accordance with the checked accuracy of the Doppler measurement result.

18. The method of claim 17 wherein comparing the first Doppler shift value with the second Doppler shift value comprises calculating a ratio of the first Doppler shift value to the second Doppler shift value and comparing the ratio to a threshold.

19. The method of claim 18, wherein the checked accuracy of the Doppler measurement result is indicated as good if the calculated ratio is larger than the threshold or indicated as bad if the calculated ratio is smaller than the threshold.

20. The method of claim 18, wherein threshold is a value usable to determine whether the first Doppler shift value and the second Doppler shift value have a same sign or opposite signs under an effect of a multipath (MP) signal.

* * * * *